May 20, 1941.    W. FRANKENBURGER ET AL    2,242,747
TRIPACK FOR PRODUCING PHOTOGRAPHIC PICTURES
Filed Jan. 11, 1939
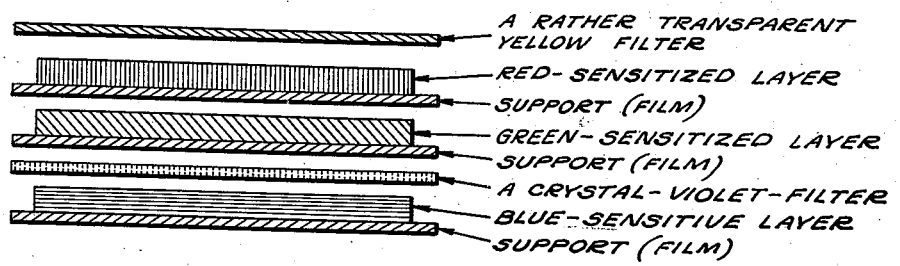
Inventors:
WALTER FRANKENBURGER,
MAX HERBST &
HERMANN SCHULZ Patented May 20, 1941

2,242,747

UNITED STATES PATENT OFFICE 2,242,747

TRIPACK FOR PRODUCING PHOTOGRAPHIC PICTURES

Walter Frankenburger, Habana, Cuba, Max Herbst, Mannheim-Rheinau, and Hermann Schulz, Heidelberg, Germany, assignors, by mesne assignments, to General Aniline & Film Corporation, New York, N. Y., a corporation of Delaware Application January 11, 1939, Serial No. 250,360
In Germany January 19, 1938

7 Claims. (Cl. 95—2)

Our present invention relates to a tri-pack for producing photographic pictures.

Tri-pack arrangements of silver halide emulsion layers for producing photographically pictures in natural colors have been described in which the red-sensitized emulsion is the first layer, that is to say is the layer nearest to the objective during exposure, the green-sensitized layer is the second and the blue-sensitized layer is the third. Such a tri-pack, as compared with the generally usual arrangement (blue-sensitive layer, green-sensitized layer, red-sensitized layer) has the advantage that it yields a fully defined blue-green print and, as this component print is essential for good definition of the finished color picture, the pictures are always of very good definition. Unsatisfactory, on the other hand, has hitherto been the color reproduction in this tri-pack arrangement. The red-sensitized layer has to register only the red component of the object; in consequence of the inherent sensitivity of the silver halide in the blue, the blue component of the object also affects this red-sensitized layer. Analogously, the green-sensitized second layer is affected by the blue, so that in this manner the colors of the finished picture are more or less falsified, depending on the extent to which during exposure a weak or strong yellow filter has depressed the action of the blue component of the object on the first two layers of the tri-pack. The use of a strong yellow filter generally necessary for a good color effect in the first two layers of the tri-pack necessitates for the last layer, which during exposure is furthest from the objective, a very highly blue-sensitive emulsion and the highest sensitivity of the tri-pack for a given yellow exposure filter is determined by the maximum obtainable sensitivity in this blue sensitive emulsion.

The present invention is based on the observation that, in spite of a sufficiently dense yellow filter leading to a good color production in the first two layers, the color reproduction, particularly in the case of green objects, is not completely satisfactory. The reproduction of the yellow component of the object shows a defect. It is an object of our invention to overcome this disadvantage.

Another object of the invention is to provide an expedient by which the light penetrating through the first two layers is so far weakened that of the light having wave length 500 mµ at least 60 per cent is absorbed and of light of longer wave length than this a still greater percentage, preferably about 90 per cent.

A further object of the invention is to provide for this purpose a Crystal Violet (see Schultz, Farbstoff-Tabellen, 1923, 1st vol., No. 516) filter which has at 500 mµ an extinction increasing towards the longer waves, greater than 0.5, preferably 1.0.

Other objects and advantages of our present invention will appear from the description following hereinafter especially when taken with the accompanying self-explanatory drawing which discloses diagrammatically and in section a film according to the present invention.

Instead of a separate intermediate filter before the third layer of the tri-pack, there may be also firmly bound the third emulsion layer on its front-side with a filter layer colored in corresponding manner or the support of the second layer may be correspondingly colored on the layer side when the third layer is exposed from the emulsion side. When the layer is exposed from the rear side, the support of the last layer may be correspondingly colored or coated with a separate colored filter layer from a colloid capable of swelling or soluble in the photographic baths.

There are available at the present time silver halide emulsions red-sensitized with the aid of suitable sensitizers which, in comparison with their blue-sensitivity, have a very high red sensitivity. By using such emulsions for producing the first layer which is the nearest to the objective during exposure in a tri-pack of the arrangement: red-sensitized layer, green-sensitized layer, blue-sensitive layer, it becomes sufficient in daylight to provide a rather transparent yellow filter in front of the tri-pack to obtain a good color reproduction in the first two layers, so that it is now possible with the aid of the unconditionally necessary intermediate filter described above in its various modifications to obtain a sensitive tri-pack which has the advantage as compared with all arrangements hitherto described that it yields well-defined and at the same time correct color pictures. In artificial light the yellow filter can be correspondingly thinner or by using suitable emulsions it may be altogether omitted. It is always necessary, however, to use an appropriately colored intermediate filter as described above for good color reproduction.

Such a tri-pack is of particular advantage, if one or more emulsions described in the specification of U. S. application corresponding with German application I 60,234 IVa/57b are used, for the production of a colored picture to be viewed by reflected light by converting the negatives obtained by normal development after exposure of the tri-pack by means of etching by hydrogen peroxide into positive gelatin reliefs which on their part serve for producing pictures of natural colors by the imbibition process. Preferably, the layers are colored for the purpose of better reproduction of detail in the manner described in specifications of U. S. Patent No. 2,061,230 dated November 17, 1936, or application Serial No. 207,226 filed May 11, 1938, with one of the pigments which are insoluble in photographic treating baths, do not affect the sensitizing and have a particle diameter not exceeding 1 $\mu$, and for the coloring of all the layers even the same dyestuff will serve. The proportion of dyestuff in the different layers calculated per unit surface may be the same or different.

Obviously such a tri-pack may be used for making color copies from the existing transparencies.

We claim:

1. A tri-pack for producing photographic pictures which comprises a support, three silver halide gelatin emulsion layers superimposed one upon the other, the top layer being sensitive to red, the second layer being sensitive to green, the bottom layer being sensitive to blue, and means arranged between said second layer and said bottom layer and adapted to absorb at least 60 per cent of the light having wave length 500 m$\mu$ and a still greater percentage of light of longer wave length than this.

2. A tri-pack for producing photographic pictures which comprises a support, three silver halide gelatin emulsion layers superimposed one upon the other, the top layer being sensitive to red, the second layer being sensitive to green, the bottom layer being sensitive to blue, and a filter arranged between said second layer and said bottom layer and having at 500 m$\mu$ an extinction increasing towards the longer waves greater than 0.5.

3. A tri-pack for producing photographic pictures which comprises a support, three silver halide gelatin emulsion layers superimposed one upon the other, the top layer being sensitive to red, the second layer being sensitive to green, the bottom layer being sensitive to blue, and a separate intermediate filter arranged between said second layer and said bottom layer and having at 500 m$\mu$ an extinction increasing towards the longer waves greater than 0.5.

4. A tri-pack for producing photographic pictures which comprises a support, three silver halide gelatin emulsion layers superimposed one upon the other, the top layer being sensitive to red, the second layer being sensitive to green, the bottom layer being sensitive to blue, and a filter arranged between said second layer and said bottom layer, firmly fixed to one of these layers and having at 500 m$\mu$ an extinction increasing towards the longer waves greater than 0.5.

5. A tri-pack for producing photographic pictures which comprises three silver halide gelatin emulsion layers superimposed one upon the other, the top layer being sensitive to red, the second layer being sensitive to green, the bottom layer being sensitive to blue, and a colored support arranged between said second layer and said bottom layer and adapted to absorb at least 60 per cent of the light having wave length 500 m$\mu$ and a still greater percentage of light of longer wave length than this.

6. A tri-pack for producing photographic pictures which comprises a support, three silver halide gelatin emulsion layers superimposed one upon the other, the top layer being sensitive to red, the second layer being sensitive to green, the bottom layer being sensitive to blue, a yellow filter arranged in front of said top layer, and means arranged between said second layer and said bottom layer and adapted to absorb at least 60 per cent of the light having wave length 500 m$\mu$ and a still greater percentage of light of longer wave length than this.

7. A tri-pack for producing photographic pictures which comprises a support, three silver halide gelatin emulsion layers superimposed one upon the other, the top layer being sensitive to red, the second layer being sensitive to green, the bottom layer being sensitive to blue, and means arranged between said second layer and said bottom layer and adapted to absorb at least 60 per cent of the light having wave length 500 m$\mu$ and a still greater percentage of light of longer wave length than this, at least one of said emulsion layers containing a finely dispersed pigment having a particle diameter not exceeding 1 $\mu$, being insoluble in photographic treating baths and not affecting silver halide.

WALTER FRANKENBURGER.
MAX HERBST.
HERMANN SCHULZ.